Figure 1:
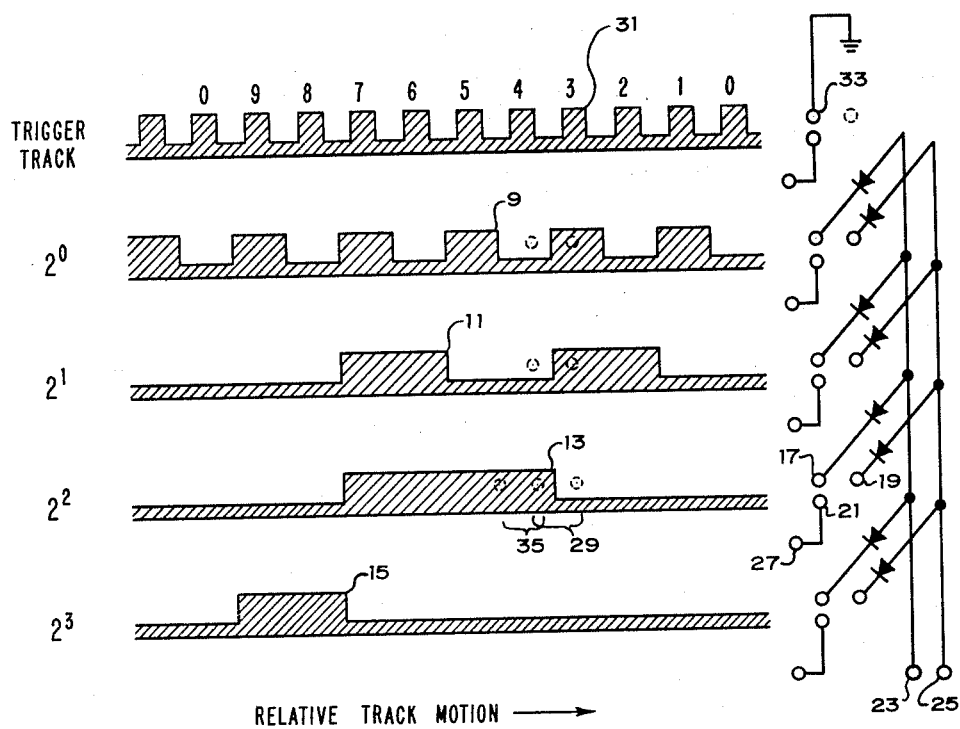

July 14, 1964   D. C. HARTKE ETAL   3,141,160
ELECTRO-MECHANICAL SIGNALLING APPARATUS
Filed Sept. 28, 1962   2 Sheets-Sheet 1

INVENTORS
DEXTER C. HARTKE
JEROME M. IDELSOHN
BY
ATTORNEY

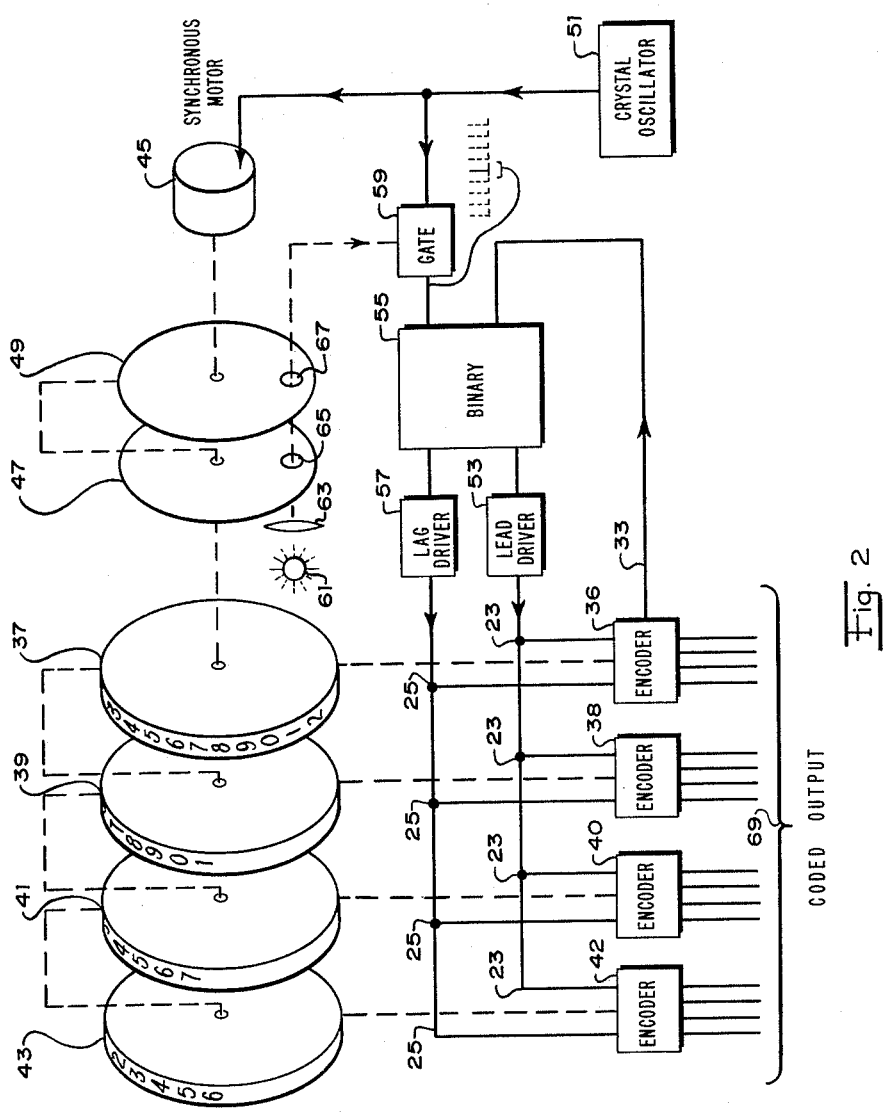

United States Patent Office 3,141,160
Patented July 14, 1964

3,141,160
ELECTRO-MECHANICAL SIGNALLING APPARATUS
Dexter C. Hartke, Los Altos Hills, Calif., and Jerome M. Idelsohn, Oak Park, Mich., assignors to Hewlett-Packard Company, Palo Alto, Calif., a corporation of California
Filed Sept. 28, 1962, Ser. No. 226,946
1 Claim. (Cl. 340—347)

This invention relates to apparatus for converting the mechanical position of an element into electrical signals and more particularly to apparatus for improving the accuracy of signals produced by a shaft encoder.

Many applications in which desired information is derived from the mechanical position of an element, require means for producing electrical signals to identify each of several positions in which the element may be set. This is commonly achieved in mechanical counters by providing shaft encoders for each of the wheels or drums carrying the readout or display characters. If the mechanical counter is driven at a constant rate so that lapsed time is displayed then the electrical signals identifying the positions of the character wheels must be provided with extreme accuracy. Several self-checking codes and double-brush schemes are known for improving the accuracy of encoders. However, their accuracy using schemes of this type is still limited by backlash in mechanical linkage, the accuracy with which the code pattern is produced and other factors. When such a mechanical counter is operated as a clock from a crystal-controlled electrical drive mechanism, the electrical signals identifying the positions of the character wheels can only be resolved to within several milliseconds of the crystal standard. Thus, while the long-term accuracy of such a clock is limited by the crystal standard, its short-term accuracy is limited by mechanical factors inherent in the encoder and its drive mechanisms.

Accordingly, it is an object of the present invention to provide means for improving the accuracy with which electrical signals identifying the mechanical positions of an element are produced.

It is another object of the present invention to provide an electro-mechanical clock with means for producing electrical time signals having extremely high long-term and short-term accuracies.

In accordance with the illustrated embodiment of the present invention a conventional encoder having signal tracks for producing electrical information about its input shaft position according to the binary or other code and having lead and lag brushes for each signal track is adapted to be actuated by a character wheel of a mechanical counter. The character wheels are linked by suitable mechanical means to a synchronous motor which is driven by a crystal-controlled signal source. The mechanical linkage between the character wheels and the synchronous motor includes mechanical gating means which passes one of the crystal-controlled signals per selected time interval. This gated signal switches a trigger circuit which in turn selects which one of the lead and lag brushes is connected to the output. This occurs at a time when the brushes are disposed on alternate sides of a transition in the conductivity of a signal track. Wide variations in the mechanical tolerances of the counter and the encoder drive mechanism are thus permissible because the switching time is dependent only upon the accuracy of the crystal-controlled oscillator.

FIGURE 1 of the enclosed drawing shows a pictorial diagram of an encoder showing the relationship between the brushes and signal tracks and FIGURE 2 of the drawing is a pictorial diagram of the electro-mechanical apparatus of the present invention which uses an encoder of the type shown in FIGURE 1.

Referring to FIGURE 1, there is shown a plurality of tracks 9, 11, 13 and 15 having a selected pattern for producing the desired coded position information. Each track is provided with a set of three brushes, one of the brushes 17 being a lead brush, another of the brushes 19 being a lag brush, and the last of the brushes being a common brush. All of the lead brushes are connected through diodes to lead brush terminal 23 and all of the lag brushes are connected through diodes to lag brush terminal 25. Each of the common brushes 21 is connected to an output terminal 27 of the encoder. The patterns of signal tracks 9 through 15 provide binary coded information of ten discrete mechanical positions. Other patterns for signal tracks may readily be provided for other mechanical position requirements and for other output code requirements.

The scheme which uses lead and lag brushes to eliminate the ambiguity in coded output information is commonly known and is described briefly in the following description. Lead brush 17 and lag brush 19 are shown in position 29 disposed about a transition from the conductive to the nonconductive portions of the signal track 13. Other pairs of lead and lag brushes are similarly disposed on the other signal tracks in the same relative positions as shown at the right side of FIGURE 1. When the lead and lag brushes are in position 29, the output signal on common brush 21 is determined by the conductivity between the common brush and the lag brush 19 which is disposed in the nonconductive portion of the signal track 13. At the same time the lead brush 17 is disposed in the conductive portion of the signal track. Other pairs of lead and lag brushes are similarly disposed on the nonconductive and conductive patterns of signal tracks 9 and 11. At a moment whcih is selected by the apparatus of FIGURE 2, the signal applied to lag brush terminal 25 is switched to the lead brush terminal 23. This produces a change in the output signals at a time which is independent of the relative velocity of the brushes and signal tracks and of slight misalignments in the transitions in each of the signal tracks.

Conventional encoders are provided with a trigger track 31, usually the same track as the signal track for the least significant digit. A set of brushes similar to the brushes provided for each of the signal tracks is also provided. The pattern of the trigger track is so disposed relative to the patterns of the signal tracks that this switching from the lag brush of each signal track to the lead brush is accomplished at the instant when the pair of brushes 33 on the trigger track pass beyond a transition in the track. The accuracy with which the change in output signal is produced in the conventional encoder is related to the accuracy with the trigger track 31 is disposed relative to the trigger brushes 33 and to the remaining signal tracks. It is also limited by the backlash, bearing tolerances and other factors inherent in the mechanical linkage between the encoder and the mechanical element. A shore mechanical interval later when the lead and lag brush pairs for each of the tracks are in position 35, the signal applied to lead brush terminal 23 is switched and is applied to lag brush terminal 25. This occurs both in the apparatus of the present invention and in the conventional encoder when a pair of the trigger brushes pass a transition in the trigger track 31. This switching time is generally not critical since the switching occurs at a mechanical interval when output signal remains unchanged.

FIGURE 2 shows a plurality of character wheels 37, 39, 41 and 43 disposed to operate as a mechanical counter. The counter is driven by a synchronous motor 45 through suitable mechanical means and gear trains including rotating elements 47 and 49. The synchronous motor 45 is energized by the signal which is produced by the crystal oscillator 51. A mechanical counter so operated thus displays lapsed time with a long-term accuracy that is determined by the accuracy of the crystal oscillator 51. Each of the character wheels 37 through 43 is provided with an encoder of the type shown in FIGURE 1. The lead brush terminals 23 of each of the encoders 36 thorugh 42 is connected through lead driver 53 to one output of binary 55. The lag brush terminals 25 of each of the encoders 36 through 42 is connected through lag driver 57 to the other output of binary 55. The lead driver 53 and lag driver 57 each include a switch which is responsive to the output of binary 55 and which applies a selected voltage to the proper brushes of encoders 36 through 42. A signal derived from the crystal oscillator 51 is applied through gate 59 to an input of binary 55. Gate 59 includes a photoresponsive element and is adapted to be enabled in response to illumination received from lamp 61 through lens 63 and apertures 65 and 67. The pair of trigger brushes of the encoder 36 which is connected to the character wheel 37 carrying the least significant digits is connected to the other input of binary 55.

Aperatures 65 and 67 in the rotating elements 47 and 49, which may be gear wheels or other elements in the mechanical connection between the counter and the synchronous motor 45, are aligned at selected intervals and allow lamp 61 to illuminate the photoresponsive elements in gate 59. This gate time is so chosen that one pulse is gated out per selected number of recurring signals from crystal oscillator 51. In practice, one pulse per second is produced with a short-term accuracy equal to that of the crystal oscillator 51. This single pulse or control signal occurring once per second triggers binary 55 which, in turn, switches the signal from the lag brush terminals 25 to the lead brush terminals 23 of each of the encoders 36 through 42. This occurs at an instant when the lead brushes for each of the signal tracks have passed over a transition in pattern of each of the tracks.

The instant at which this switching occurs determines the instant at which the coded output 69 is produced, which instant is determined with the accuracy of the crystal oscilaltor 51. A small mechanical increment later when the brushes on each of the signal tracks of the encoders are both within the same portion of the signal track, a signal from the trigger brushes 33 of the encoder 36 causes binary 55 to switch. This restores the signal to the lag brush terminals 25 on each of the encoders 36 through 42. The instant at which this switching occurs is relatively unimportant and is controllable by the trigger brushes 33 since such switching occurs at a time when no change in the output signal results.

We claim:

Electromechanical apparatus comprising:
an oscillator for producing a recurring signal at a fixed frequency;
a synchronous motor connected to receive said recurring signal for producing angular motion related to said fixed frequency;
an element settable in a plurality of angular positions;
means linking said motor to said element for altering the position thereof in response to the angular motion of said motor;
means connected to said oscillator for transmitting a selected occurrence of said signal of fixed frequency once per predetermined number of revolutions of said motor;
encoder means connected to said element for producing a signal related to the angular position of said element; and
means connected to receive the signal from said encoder means for producing an output signal in response to the transmitted occurrence of said signal of fixed frequency.

References Cited in the file of this patent
UNITED STATES PATENTS

| | | |
|---|---|---|
| 2,958,861 | Luongo et al. | Nov. 1, 1960 |
| 2,993,200 | Walker et al. | July 18, 1961 |